(12) United States Patent
Lv

(10) Patent No.: US 12,293,127 B2
(45) Date of Patent: May 6, 2025

(54) REDIRECTING APPLICATIONS BETWEEN REMOTE DESKTOPS

(71) Applicant: Omnissa, LLC, Mountain View, CA (US)

(72) Inventor: Lin Lv, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 0 days.

(21) Appl. No.: 18/123,350

(22) Filed: Mar. 20, 2023

(65) Prior Publication Data

US 2024/0319949 A1  Sep. 26, 2024

(51) Int. Cl.
  *G06F 3/14* (2006.01)
  *G06F 9/451* (2018.01)
  *H04L 67/125* (2022.01)

(52) U.S. Cl.
  CPC ............ *G06F 3/1454* (2013.01); *G06F 9/452* (2018.02); *H04L 67/125* (2013.01)

(58) Field of Classification Search
  CPC ....... G06F 3/1454; G06F 9/452; H04L 67/125
  See application file for complete search history.

(56) References Cited

U.S. PATENT DOCUMENTS

| | | | | |
|---|---|---|---|---|
| 5,408,600 | A * | 4/1995 | Garfinkel | G06F 9/542 |
| | | | | 709/204 |
| 9,535,560 | B1 * | 1/2017 | Kominac | H04L 67/02 |
| 11,734,032 | B1 * | 8/2023 | Brinkhoff | G06F 3/0481 |
| | | | | 715/204 |
| 2006/0136828 | A1 * | 6/2006 | Asano | G06F 3/1454 |
| | | | | 715/764 |
| 2007/0174410 | A1 * | 7/2007 | Croft | G09G 5/14 |
| | | | | 709/208 |
| 2007/0174429 | A1 * | 7/2007 | Mazzaferri | H04L 63/102 |
| | | | | 709/218 |
| 2009/0210934 | A1 * | 8/2009 | Innes | H04L 63/08 |
| | | | | 726/7 |
| 2014/0118239 | A1 * | 5/2014 | Phillips | G06F 3/1454 |
| | | | | 345/156 |
| 2014/0258155 | A1 * | 9/2014 | Suryanarayanan | H04L 67/1021 |
| | | | | 726/29 |
| 2014/0304322 | A1 * | 10/2014 | Dey | G06F 9/00 |
| | | | | 709/203 |
| 2016/0132214 | A1 * | 5/2016 | Koushik | G06F 8/61 |
| | | | | 715/741 |

(Continued)

OTHER PUBLICATIONS

VMware, Inc., "Configuring the Clipboard Redirection Feature", available at URL<https://docs.vmware.com/en/VMware-Horizon/2106/horizon-remote-desktop-features/GUID-A9C26545-659F-40FC-A93A-C064152DAA8F.html>, Dec. 11, 2020, 2 pages.

(Continued)

*Primary Examiner* — Patrick F Riegler
*Assistant Examiner* — Alvaro Rt Calderon, IV
(74) *Attorney, Agent, or Firm* — Kim & Stewart LLP

(57) ABSTRACT

A remote application installed on a first remote desktop can be shared with a second remote desktop. The first remote desktop can be associated with a first user, and the second remote desktop can be associated with the first user and/or some other user(s) different from the first user. The sharing of the remote application can be terminated from the first remote desktop and/or from the second remote desktop.

14 Claims, 9 Drawing Sheets

(56) References Cited

U.S. PATENT DOCUMENTS

| | | | | |
|---|---|---|---|---|
| 2016/0188356 | A1* | 6/2016 | Ramasamy | G06F 9/452 |
| | | | | 718/1 |
| 2016/0306531 | A1* | 10/2016 | Wong | G06F 9/451 |
| 2017/0003995 | A1* | 1/2017 | Hu | G06F 9/45558 |
| 2017/0054765 | A1* | 2/2017 | Tucker | H04L 67/01 |
| 2018/0284957 | A1* | 10/2018 | Afsari | H04L 65/403 |
| 2019/0129728 | A1* | 5/2019 | Ross | G06F 9/5011 |
| 2019/0132381 | A1* | 5/2019 | Momchilov | G06F 3/01 |
| 2019/0230152 | A1* | 7/2019 | Wang | G06F 16/188 |
| 2019/0230165 | A1* | 7/2019 | Wang | G06F 9/452 |
| 2019/0278616 | A1* | 9/2019 | Momchilov | G06F 9/48 |
| 2019/0340001 | A1* | 11/2019 | Vysotsky | G06F 3/0481 |
| 2020/0272484 | A1* | 8/2020 | Kunene | G06F 3/0482 |
| 2020/0371822 | A1* | 11/2020 | Zhou | H04L 67/01 |
| 2021/0334118 | A1* | 10/2021 | Liu | G06F 16/16 |
| 2022/0269378 | A1* | 8/2022 | Joseph | G06F 9/452 |
| 2023/0018479 | A1* | 1/2023 | Chai | G06F 1/3209 |
| 2023/0333713 | A1* | 10/2023 | Chanda | H04L 67/131 |
| 2023/0333714 | A1* | 10/2023 | Chanda | G06F 3/1454 |
| 2023/0403266 | A1* | 12/2023 | Cui | G06F 9/452 |

OTHER PUBLICATIONS

VMware, Inc., "Managing Access to Client Drive Redirection", available at URL <https://docs.vmware.com/en/VMware-Horizon-7/7.13/horizon-remote-desktop-features/GUID-25820640-60C2-4B7D-AE3F-F023E32B3DAE.html>, May 31, 2019, 2 pages.

Microsoft Corporation, "Azure Virtual Desktop", available at URL <https://azure.microsoft.com/en-us/products/virtual-desktop/>, 2023, 15 pages.

* cited by examiner

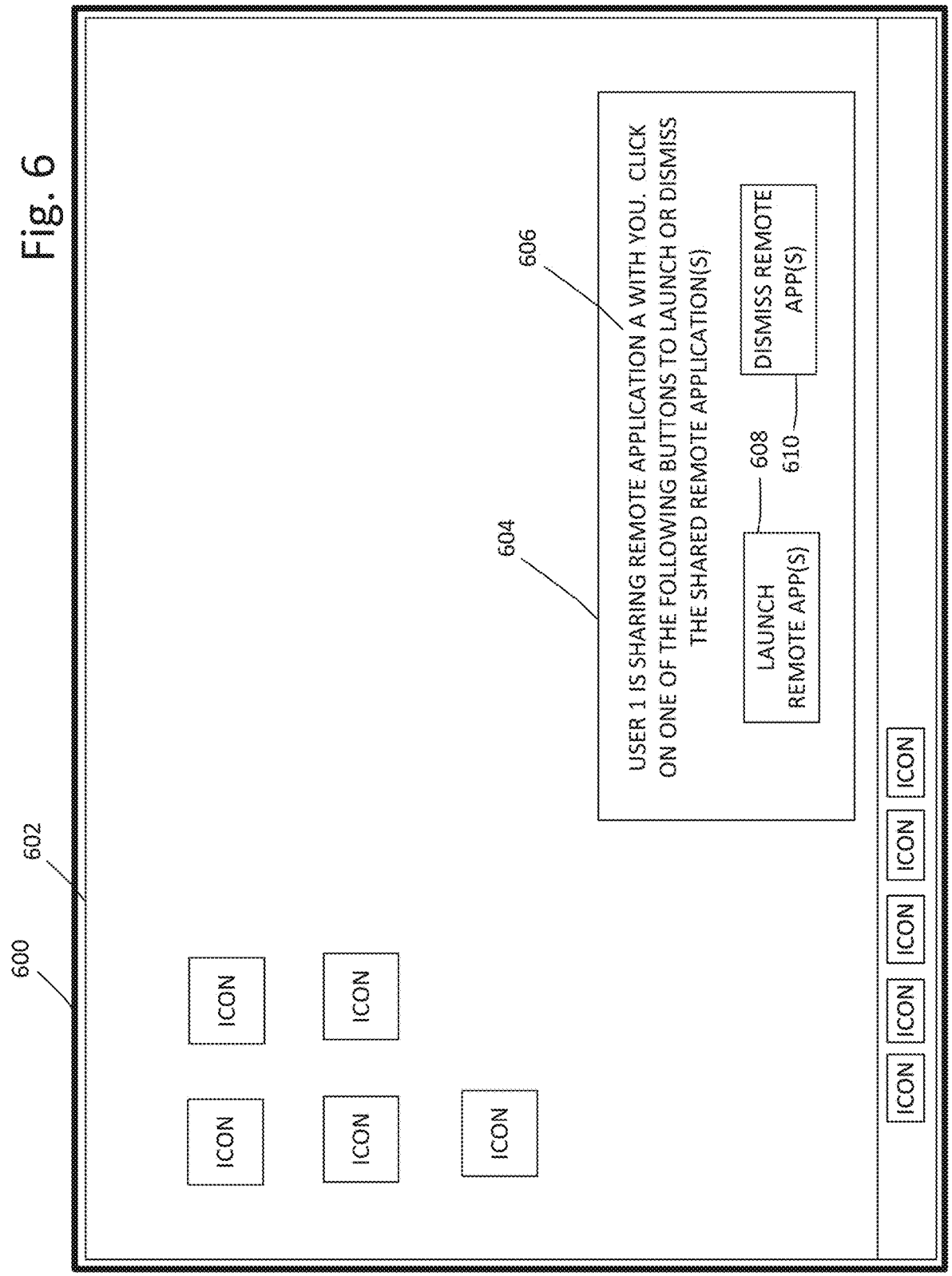

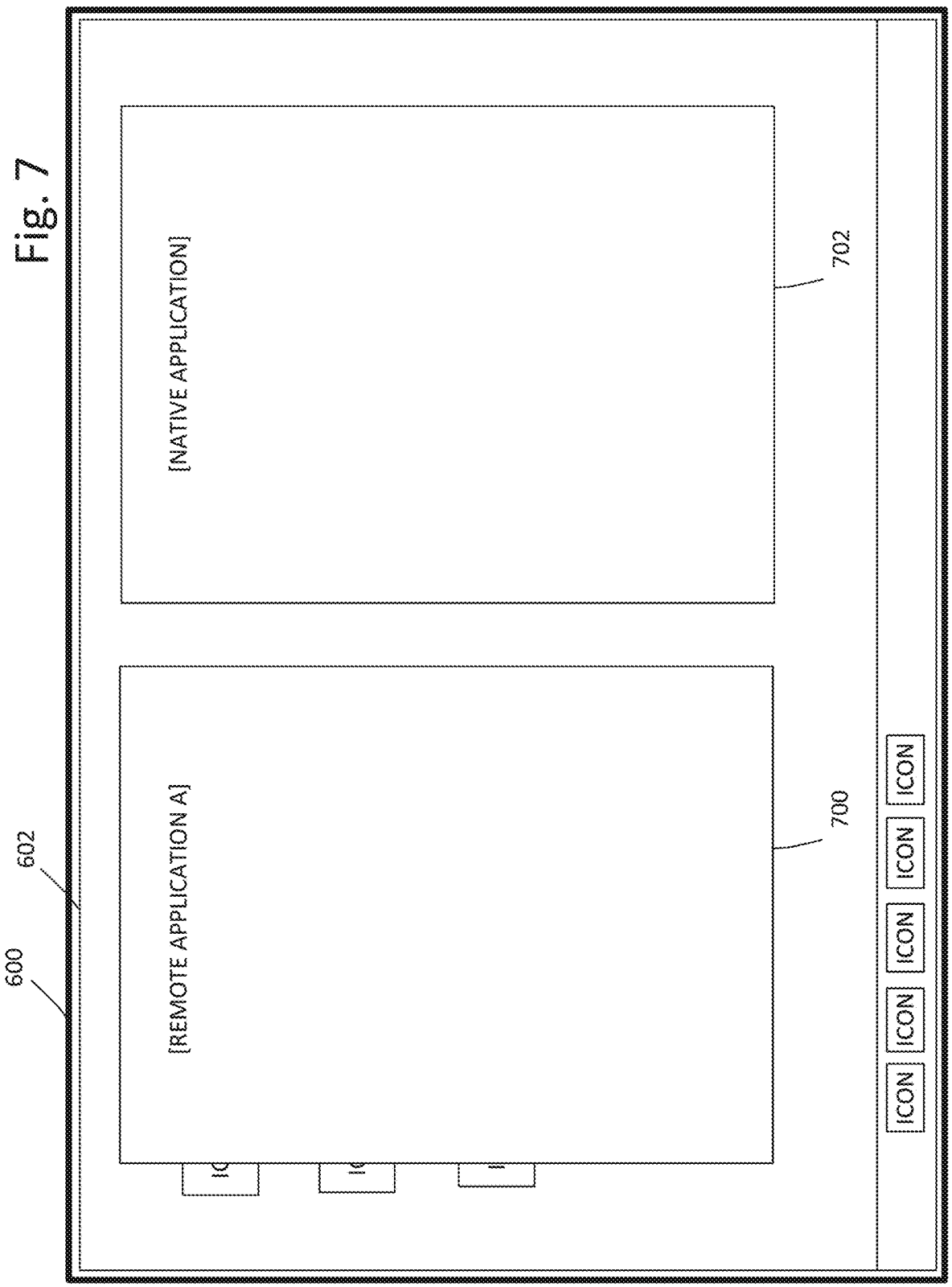

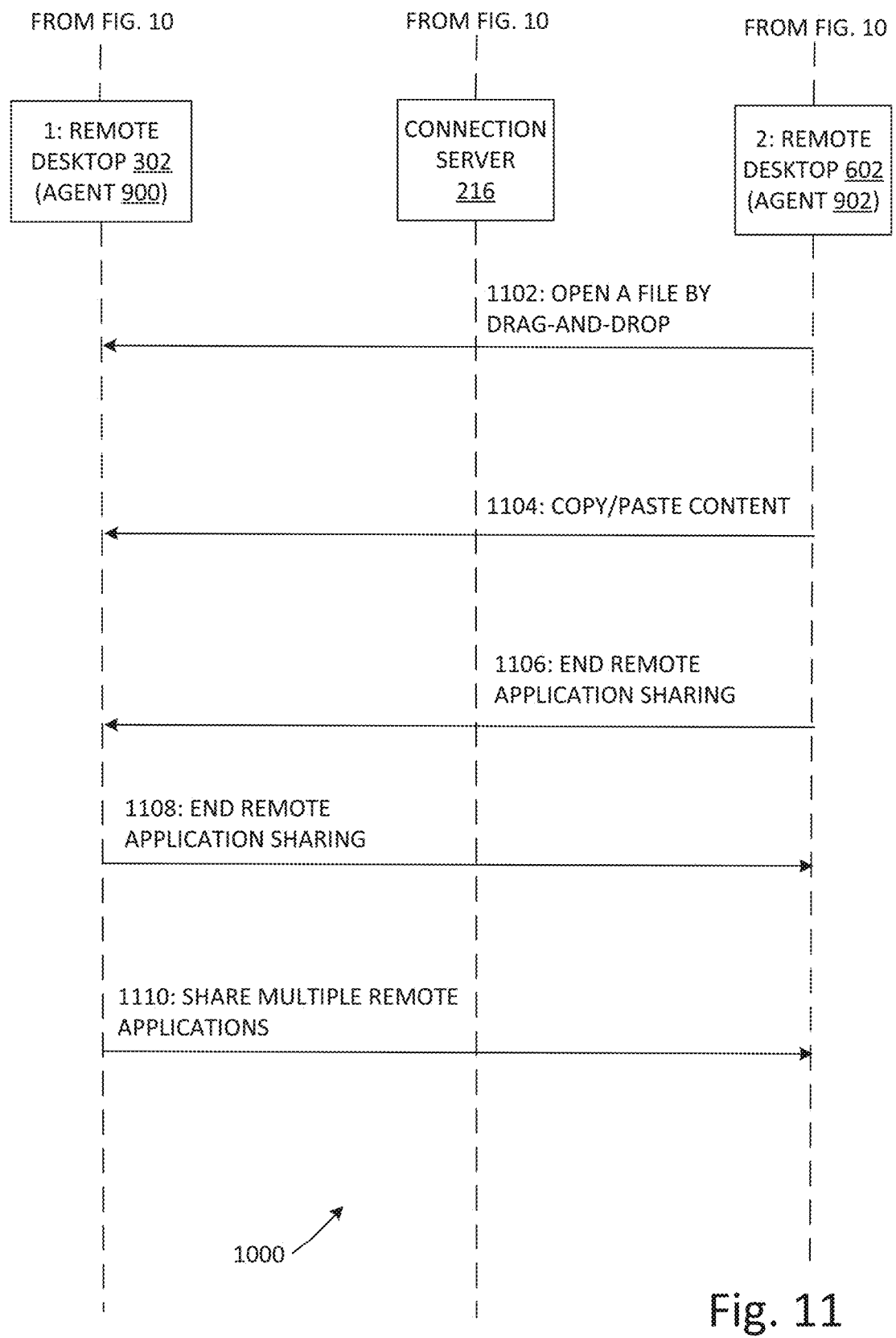

REDIRECTING APPLICATIONS BETWEEN REMOTE DESKTOPS

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualized computing instances such as virtual machines (VMs) running different operating systems (OSs) may be supported by the same physical machine (e.g., referred to as a host). Each virtual machine is generally provisioned with virtual resources to run an operating system and applications. The virtual resources in a virtualized computing environment may include central processing unit (CPU) resources, memory resources, storage resources, network resources, etc.

One example use of a virtualized computing environment is for a virtual desktop infrastructure (VDI) implementation, which is a type of desktop virtualization that allows a remote desktop to run on VMs that are provided by a hypervisor on a host. A user/client uses the operating system (OS) and remote applications (which reside and execute at the VM) via an endpoint device (local client device or local user device) of the user, just as if the OS/applications were actually running locally on the endpoint device, when in reality the OS/applications are running on the remote desktop.

Working remotely on a regular or occasional basis, such as via remote desktops rendered on laptops (or other endpoint device), has become common due to the flexibility and convenience. However, there are some drawbacks when attempting to use remote applications on multiple remote desktops.

BRIEF DESCRIPTION OF DRAWINGS

FIGS. 6 and 7 are diagrams illustrating a display screen that presents a window of an example remote desktop of a target user;

FIGS. 10 and 11 are flow diagrams of an example method to share a remote application between multiple remote desktops.

DETAILED DESCRIPTION

Figure 1:
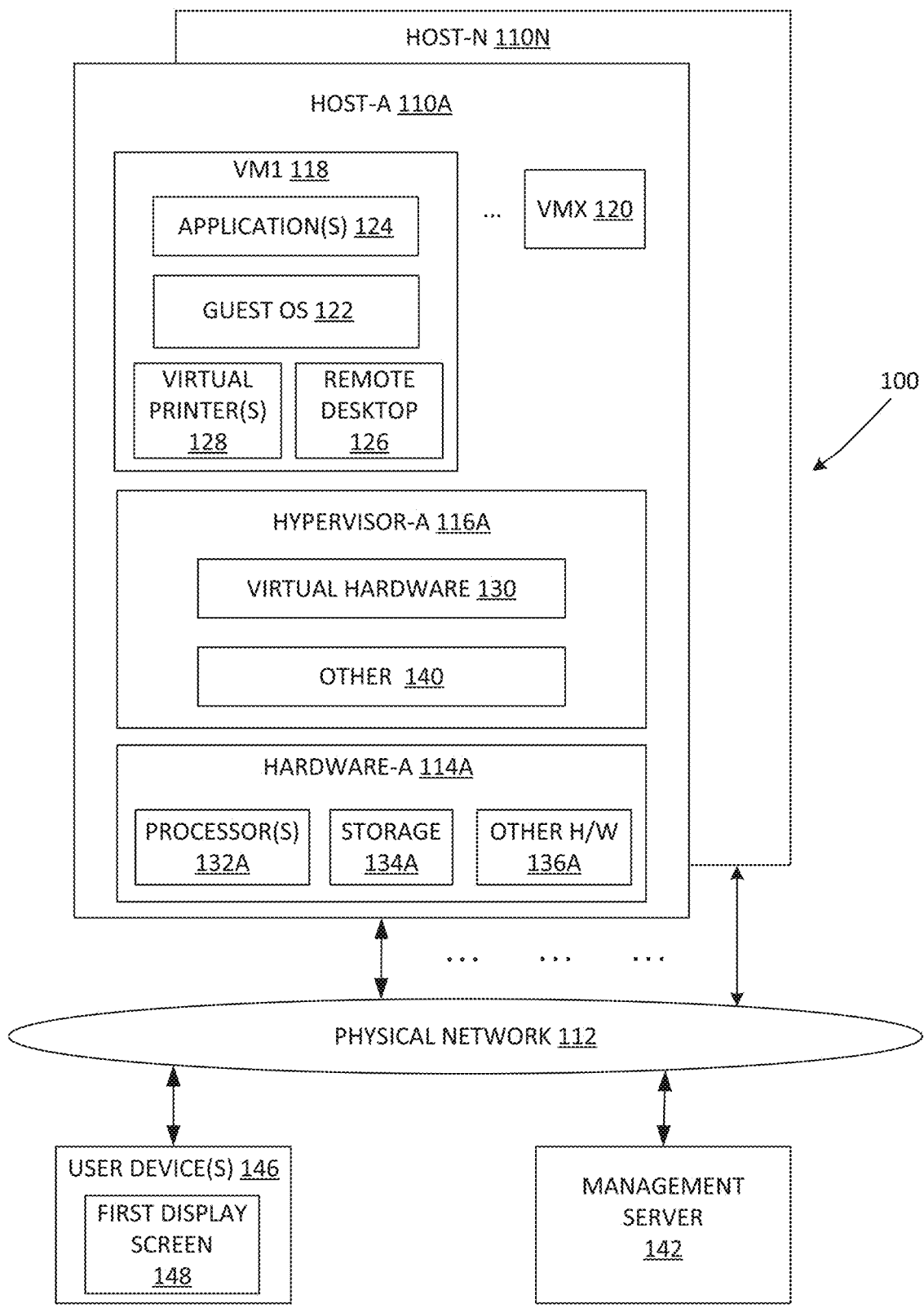
FIG. 1 is a schematic diagram illustrating an example virtualized computing environment that can implement a virtual desktop infrastructure (VDI) having capability to enable redirection (including sharing) of remote applications between multiple remote desktops.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses drawbacks associated with using remote applications on multiple remote desktops. For example and as previously explained above, a virtual desktop infrastructure (VDI) environment enables remote applications on remote desktops to be launched and operated via a local client device, such that the remote desktop provides a seamless remote desktop window on the display screen of the local client device, thereby giving a user an illusion that a local application on the local client device is being used.

However, there is limited or no capability to share the remote application between multiple remote desktops. For instance, the same user may have multiple remote desktops launched on one or more of the user's local client devices. As another example, multiple users may each have one or more remote desktops that are launched on their respective local client device(s). In these situations, sharing remote applications between these remote desktops can be advantageous to improve the users' working efficiency and user experience, and also provides savings in hardware consumption at a cloud (e.g., a public cloud).

However, there is limited or no capability to share the same remote application between these multiple remote desktops, due to a number of reasons. At least the following reasons may make it difficult to enable sharing of remote applications between multiple remote desktops:

1. Some remote applications are very large in size and occupy lots of disk space, and so users may not install multiple large remote applications on their multiple remote desktops.
2. Some remote applications are expensive, and so the users may install these expensive remote applications on only a few of their remote desktops.
3. Some remote applications are not used often, and so may not be worthwhile to install on multiple remote desktops.
4. Some remote applications involve significant time to install and configure, and so the users are discouraged from installing these remote applications on multiple remote desktops.
5. Users may install different remote applications on corresponding different remote desktops, but may at times need some remote applications (installed on corresponding different remote desktops) to work together. For example, a user may install an imageediting software on remote desktop A and a word processing software on remote desktop B. The user may then need to use/operate these two remote applications together, such as to copy/paste images and text between these two remote applications, but is unable to perform the copy/paste because the two remote applications are installed on two different remote desktops.

Sharing of Remote Applications Between Multiple Remote Desktops

The embodiments disclosed herein provide techniques that enable the sharing of one or more remote applications between multiple remote desktops of the same user and/or different users. These embodiments therefore address the above-identified and other drawbacks associated with using remote applications in existing VDI environments.

Figure 3:
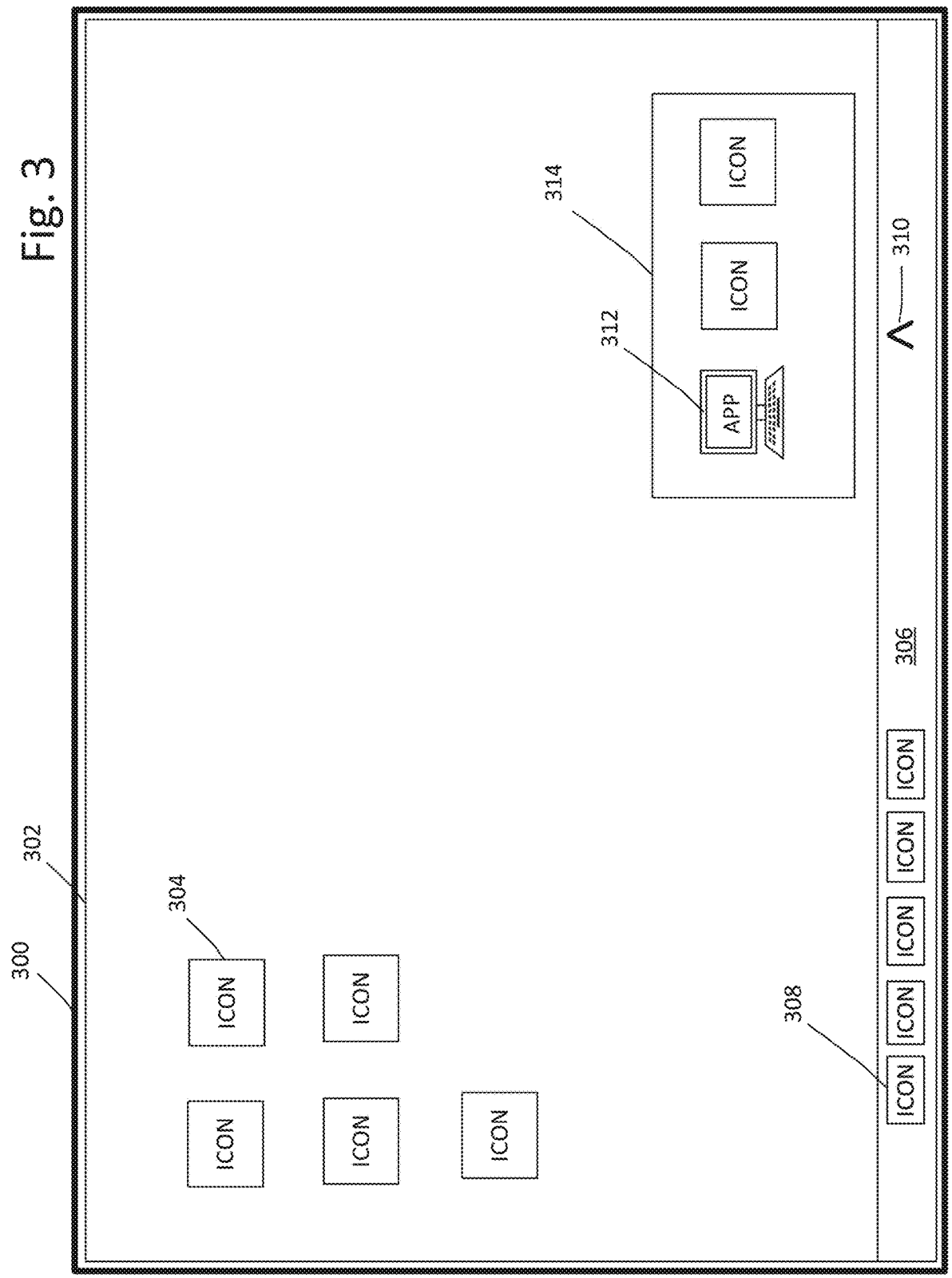
FIG. 3 is a diagram illustrating a display screen that presents a window of an example remote desktop.

Referring first to FIG. 3, FIG. 3 is a diagram illustrating a display screen 300 that presents a window of an example remote desktop 302. The display screen 300 may be the display screen of a local client device of a user, such as a display screen of a desktop computer, a display screen of a laptop computer, a display screen of a portable electronic device (such as a mobile telephone), a secondary (additional) display screen connected to the local client device, etc.

In the example shown in FIG. 3, the remote desktop 302 may include/present one or more icons 304 (such as icons of remote applications installed on the remote desktop 302), and a task bar 306 that may also include one or more icons 308. The window of the remote desktop 302 may be configured to occupy most or all of the real estate of the display screen 300.

To enable the feature of sharing remote applications, the user may access (e.g., click) on a user interface element on the remote desktop 302, such as a show hidden icons button 310 on the task bar 306. When the button 310 is clicked, one or more icons including an application sharing icon 312, are presented in a sub-window 314 at a bottom right corner or other location of the remote desktop 302.

Figure 4:
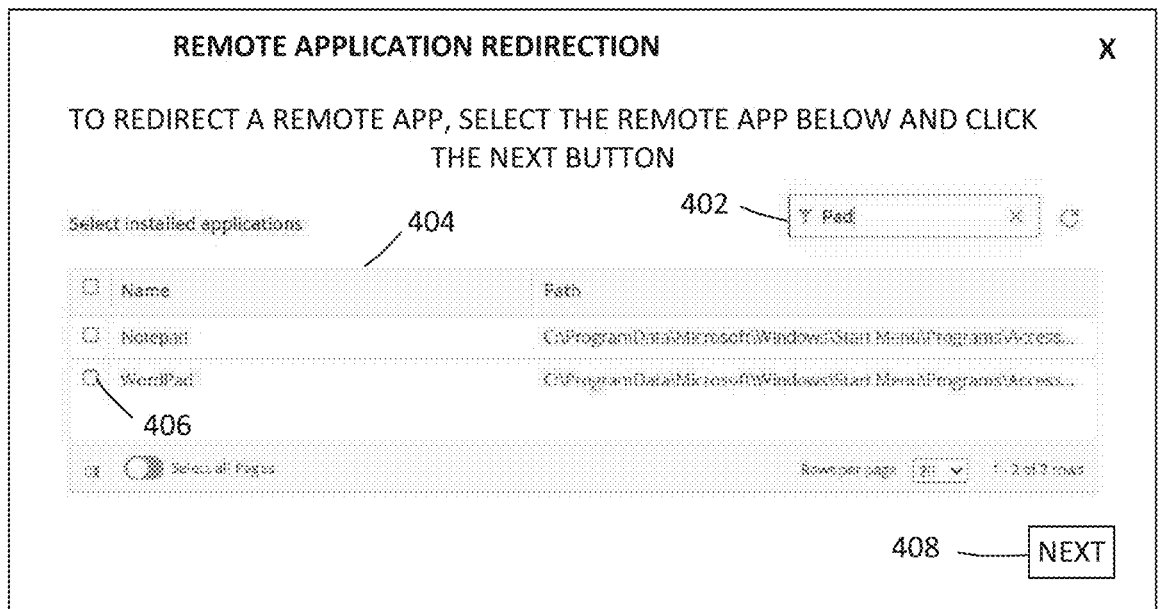
FIGS. 4 and 5 show example configuration settings for sharing a remote application.
Figure 5:
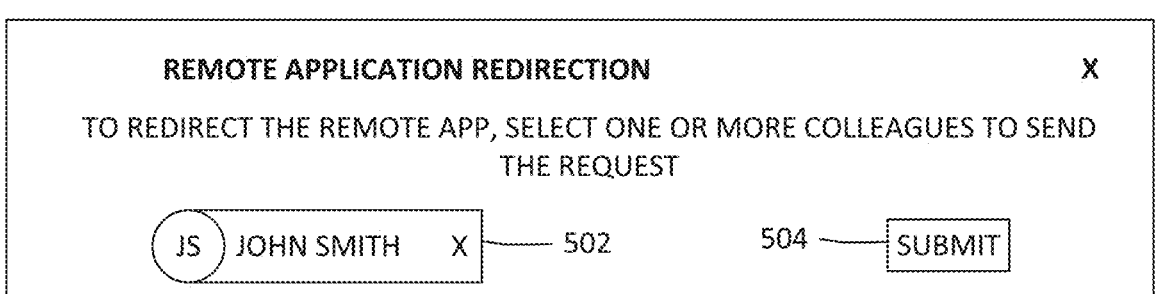

If the user wants to redirect/share one of the remote applications that are installed on the remote desktop 302, the user can click on the icon 312 to specify the parameters for this feature. FIGS. 4 and 5 show example configuration settings for sharing a remote application. The configuration settings of FIGS. 4 and 5 may be presented via windows, prompts, menu selections, etc. that are presented on/by one or more user interface(s) of the remote desktop 302, in response to the user clicking the icon 312.

In the example of FIG. 4, a first remote application redirection window 400 provides a first control panel that enables the user (e.g., user 1) to search for and select one or more remote applications to share. For example, the user may enter or otherwise provide at least a partial name of a remote application in a search field 402, as a search query for matching remote applications. A hit list 404 provides a list of remote applications that are installed on the remote desktop 302 and which correspond to the search query provided via the search field 402. The hit list 404 may identify the remote applications by their respective names and paths, and may also provide corresponding selection boxes 406 to enable the user to select one or more of the remote applications on the hit list 404 for sharing. After the user has made a selection of which remote application(s) to share, the user may click on a next button 408 to specify one or more colleagues (e.g., other users or the same user) to share the selected remote application(s).

In the example of FIG. 5, a second remote application redirection window 500 provides a second control panel that enables the user to specify one or more target users (including the same user, other colleagues, etc.) to share/receive the selected remote application(s). The user may click on a displayed name 502 of the target user(s) to select such target user(s), and then click on a submit button 504 to send a request to such target user(s) to share the remote application (s).

FIGS. 6 and 7 are diagrams illustrating a display screen 600 that presents a window of an example remote desktop 602 of a target user. The remote desktop 602 may display some similar elements as those shown in FIG. 3 previously described above, and so such similar elements will not be described further herein, for the sake of brevity.

With respect to the feature of sharing one or more remote applications, the remote desktop 602 of FIG. 6 may present a window 604 having a notification 606 that informs the target user that a user (e.g., user 1 that initiated the remote sharing in FIGS. 3-5) is requesting to share one or more remote applications (e.g., application A) with the target user. The notification 606 may prompt the target user to launch or dismiss the shared remote application(s).

The target user may click a launch button 608 to launch (e.g., accept the request to share) one or more of the remote applications (e.g., application A) being requested to be shared. Alternatively, the target user may click on a dismiss button 610 to dismiss (e.g., reject the request to share) the one or more of the remote applications being requested to be shared.

If the target user clicks on the launch button 608 to launch the remote application(s) being requested to be shared, then such remote application(s) are launched and presented on the remote desktop 602. FIG. 7 provides an example in which a window of a shared remote application 700 (e.g., application A) is presented on/by the remote desktop 602, concurrently with one or more windows of a native remote application 702 that is installed in the remote desktop 602.

Various presentation configurations are possible. As examples: the window of the shared remote application 700 may occupy the entire or partial window of the remote desktop 602; multiple windows of respective multiple shared remote applications may occupy the window of the remote desktop 602 (concurrently with or without the windows of launched native remote applications); the target user may operate multiple display screens to display windows of shared remote application(s) and/or native remote application(s), etc.

In the example of FIG. 7, the target user can use the shared remote application 700 in a manner analogous to any other (native) remote applications that are installed on the remote desktop 602. For example, the target user can operate the shared remote application 700 and native remote application 702 concurrently or separately, use the shared remote application 700 to open files located on the remote desktop 602, copy content between the shared remote application 700 and the native remote application(s) on the remote desktop 602, etc.

Furthermore in various embodiments, the original user (e.g., user 1) and the target user may operate the shared remote applications independently from each other. For example, the documents/operations being performed by the original user (e.g., user 1) with the remote application A on the remote desktop 302 are isolated from and are not viewable by the target user on the remote desktop 602, and vice versa. Thus, the usage of the remote application by one user does not affect the usage of the remote application by the other user, but with the capability of the original user and/or the target user to terminate the sharing of the remote application.

Figure 8:
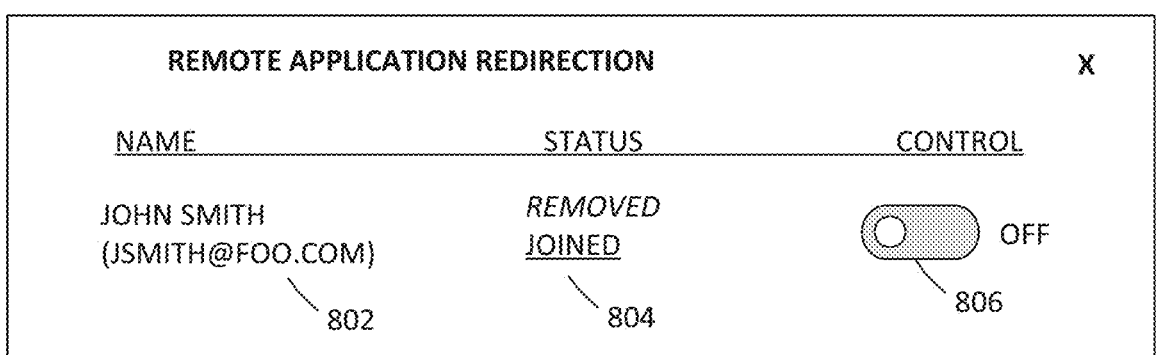
FIG. 8 shows an example control panel that enables the termination of the sharing of a remote application.

As an example, FIG. 8 shows a third remote application redirection window 800 that provides a third control panel that enables the original user to terminate the sharing of the remote application. The window 800 may identify (e.g., by name and email address) the target user at 802 and the current status of the remote application with respect to the target user, at 804, such as whether the target user has been joined (the current setting, indicated by underlining) or removed with respect to sharing the remote application. The original user may control the sharing (e.g., turning off or on) of the remote application by clicking on a button 806.

According to various embodiments, the window 800 or other analogous window(s) can be used to turn off/on the sharing on a per-application basis for each individual target user, globally for all remote applications being shared with one or more individual target users, on a per-target user basis, etc.

To assist in further explaining the details of how remote applications may be shared, such as in the examples shown and described above with respect to a user sharing a remote application between different remote desktops of the same user and/or other users, a description is provided next below regarding a computing environment and client and agent components that may be provided to support the capability to share/redirect remote applications.

Computing Environment

FIG. 1 is a schematic diagram illustrating an example virtualized computing environment 100 that can implement a virtual desktop infrastructure (VDI) having capability to enable redirection (including sharing) of remote applications between multiple remote desktops. Depending on the desired implementation, virtualized computing environment 100 may include additional and/or alternative components than that shown in FIG. 1.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. Examples of the physical network 112 can include a wired network, a wireless network, the Internet, or other network types and also combinations of different networks and network types. For simplicity of explanation, the various components and features of the hosts will be described hereinafter in the context of the host-A 110A. Each of the other host-N 110N can include substantially similar elements and features.

The host-A 110A includes suitable hardware 114A and virtualization software (e.g., a hypervisor-A 116A) to support various virtual machines (VMs). For example, the host-A 110A supports VM1 118 . . . . VMX 120, wherein X (as well as N) is an integer greater than or equal to 1. In practice, the virtualized computing environment 100 may include any number of hosts (also known as computing devices, host computers, host devices, physical servers, server systems, physical machines, etc.), wherein each host may be supporting tens or hundreds of virtual machines. For the sake of simplicity, the details of only the single VM1 118 are shown and described herein.

VM1 118 may be an agent-side VM that includes a guest operating system (OS) 122 and one or more guest applications 124 (e.g., remote applications and their corresponding processes) that run on top of the guest OS 122. Using the guest OS 122 and/or other resources of VM1 118 and the host-A 110A, VM1 118 may generate one or more remote desktops 126 (e.g., the remote desktops 302, 602, or other virtual desktops) that is operated by and accessible to one or more client-side user device(s) 146 (e.g., a local client device) via the physical network 112. One or more virtual printers 128 also may be instantiated in VM1 118 and/or elsewhere in the host-A 110A, and may correspond to one or more physical printers (not shown) connected to the user device 146 at the client side. VM1 118 may include other elements, such as code and related data (including data structures), engines, etc., which will not be explained herein in further detail, for the sake of brevity.

The user device 146 may include a first display screen 148 (e.g., the display screen 300 or 600) and other components (explained in more detail in FIG. 2) to support the use of the user device 146 in cooperation with the virtual desktop 126 and other elements of VM1 118. The first display screen 148 or some other display screen may render the various example windows shown and described herein when the user device 146 launches a remote desktop application.

According to various embodiments, VM1 118 may operate as an agent that provides the remote desktop 126 (and other remote desktop features) to one or more of the user device 146. For instance, the agent can cooperate with client software (referred to at times herein as a remote desktop application, client application, remote desktop client, or client, installed at the user device 146) to establish and maintain a remote desktop connection between VM1 118 and the user device 146 for purposes of enabling the user to operate the user device 146 in order to access and use the remote desktop 126. In some embodiments, the agent can be a sub-component of VM1 118. Examples of the agent and client software are the Horizon agent and the Horizon client, respectively, of VMware, Inc. of Palo Alto, California. One or more connection servers 216 (shown in FIG. 2) can broker or otherwise manage communications between the agent (e.g., a Horizon agent or other analogous remote desktop agent) and the client software (e.g., a Horizon client or other analogous remote desktop client) over a VDI connection 208 (also shown in FIG. 2) provided by the physical network 112. A management server 142 and/or other server(s)/device(s) can operate as the connection server in some implementations.

The hypervisor-A 116A may be a software layer or component that supports the execution of multiple virtualized computing instances. The hypervisor-A 116A may run on top of a host operating system (not shown) of the host-A 110A or may run directly on hardware 114A. The hypervisor 116A maintains a mapping between underlying hardware 114A and virtual resources (depicted as virtual hardware 130) allocated to VM1 118 and the other VMs. The hypervisor-A 116A may include other elements (shown generally at 140), including tools to provide resources for and to otherwise support the operation of the VMs.

Hardware 114A in turn includes suitable physical components, such as central processing unit(s) (CPU(s)) or processor(s) 132A; storage device(s) 134A; and other hardware 136A such as physical network interface controllers (NICs), storage disk(s) accessible via storage controller(s), etc. Virtual resources (e.g., the virtual hardware 130) are allocated to each virtual machine to support a guest operating system (OS) and remote application(s) in the virtual machine, such as the guest OS 122 and the guest application (s) 124 (e.g., a word processing application, accounting software, a browser, etc.) in VM1 118. Corresponding to the hardware 114A, the virtual hardware 130 may include a virtual CPU, a virtual memory, a virtual disk, a virtual network interface controller (VNIC), etc.

The management server 142 of one embodiment can take the form of a physical computer with functionality to manage or otherwise control the operation of host-A 110A . . . host-N 110N. In some embodiments, the functionality of the management server 142 can be implemented in a virtual appliance, for example in the form of a single-purpose VM that may be run on one of the hosts in a cluster or on a host that is not in the cluster.

The management server 142 may be communicatively coupled to host-A 110A . . . host-N 110N (and hence communicatively coupled to the virtual machines, hypervisors, hardware, etc.) via the physical network 112. In some embodiments, the functionality of the management server 142 may be implemented in any of host-A 110A . . . host-N 110N, instead of being provided as a separate standalone device such as depicted in FIG. 1.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Figure 2:
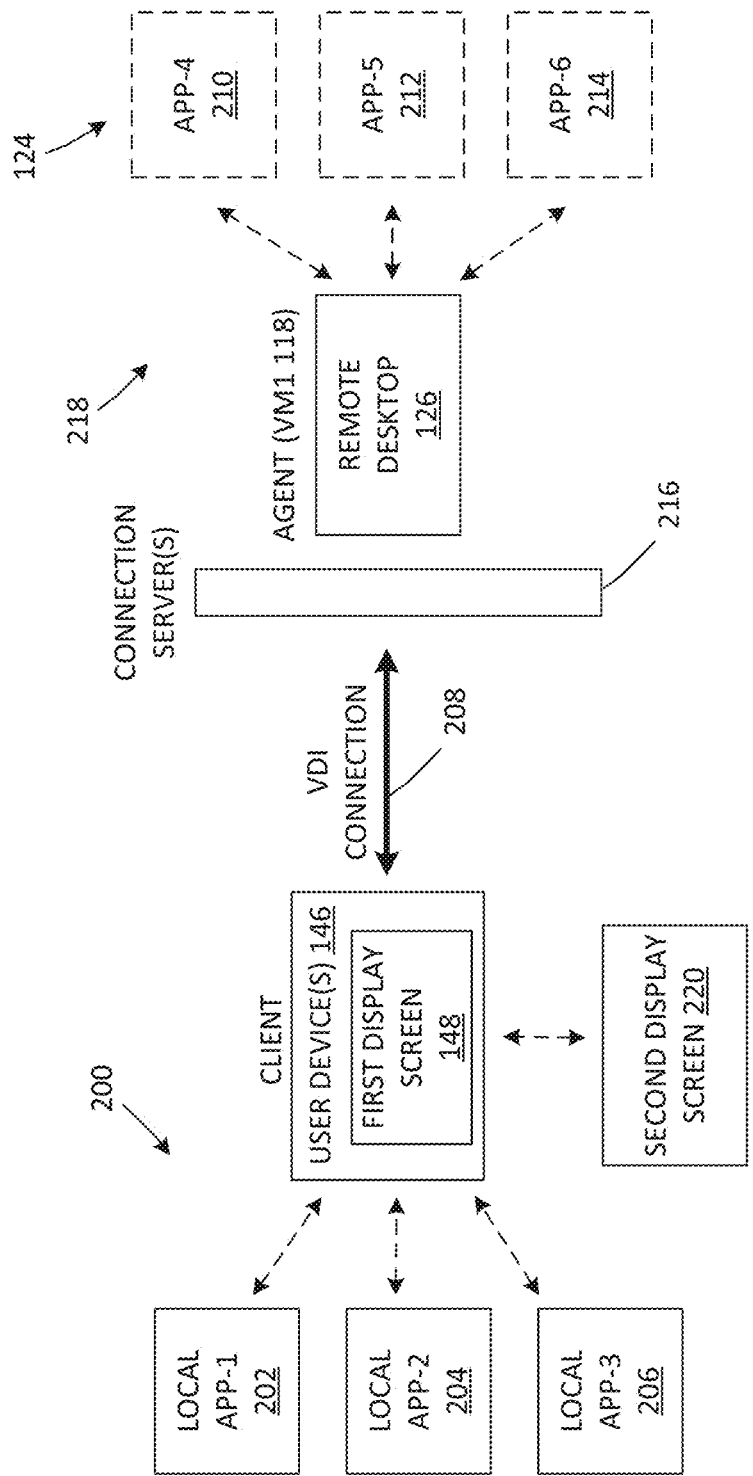
FIG. 2 is a schematic diagram illustrating client and agent devices for the virtualized computing environment of FIG. 1.

FIG. 2 is a schematic diagram illustrating client and agent devices for the virtualized computing environment 100 of FIG. 1. More specifically, FIG. 2 shows a client (e.g., a Horizon client or other analogous remote desktop client running on the user device 146), an agent (e.g., the VM1 118 and/or a component thereof, such as a Horizon agent or other analogous remote desktop agent, that provides the remote desktop 126 and which runs on a host), and their associated remote applications that may be displayed on their respective desktops (remote displays).

At a client side 200, the user device 146 may have local applications (APPs) installed on it. These applications may include a local APP-1 202, a local APP-2 204, a local APP-3 206, etc. These local applications (e.g., their respective icons or launched files/interfaces) may in turn be presented on a local desktop rendered on the first display screen 148 of the user device 146. Examples of these local applications may include but not be limited to Slack, Microsoft Teams, Microsoft Outlook, and/or other types of messaging/collaboration applications, as well as other locally installed applications such as a calendar application, word processing application, spreadsheet application, games, browser, etc.

One or more additional (second) display screens 220, which can be the respective display screens 300 and 600 of FIGS. 3 and 6, may be present at the client side 200. For example, the display screen(s) 220 may be another display screen connected to the user device 146 of the user, a display screen of another user device of the same user, a display screen of a user device of some other user, a secondary/additional display screen of another user device of that other user, etc.

The remote desktop client installed at the user device 146 may use one or more VDI connections 208 to establish and conduct a remote desktop session with the VDI at an agent side 218. One or more connection servers 216 at the agent side 218 may manage these connections to the remote desktops 126 (e.g., for brokering communications, load balancing purposes, etc.).

At the agent side 218, the remote desktop 126 may provide remote applications installed/running thereon (e.g., the guest applications 124 of FIG. 1). These applications on the remote desktop 126 may include an APP-4 210, an APP-5 212, an APP-6 214, etc. These remote applications (e.g., their respective icons or launched files/interfaces) may in turn be presented on the remote desktop 126 rendered on the display screen 300 or 148 of the user device 146 (e.g., the remote desktop 302 shown in FIG. 3) when the user device 146 accesses the remote desktop 126, and these remote applications may also be shared with target users such as in the manner shown and described above with respect to FIGS. 3-8. In some embodiments, one or more of the remote applications APP-4 210, an APP-5 212, an APP-6 214, etc. may be a browser, multimedia player, online meeting platform, communication application, electronic game, word processing application, or any other type of application or tool that may be shared with one or more other remote desktops.

FIG. 2 has been shown and described above with respect to the connection server 216 brokering/managing the connections and communications between the client side 200 and the agent side 218. With respect to the sharing of remote applications, the connection server 216 may be configured to manage connections/communications between remote desktops (e.g., managing agent-to-agent interactions), such as in the manner that will be explained next below with respect to FIGS. 9-11.

Components for Sharing a Remote Application

Figure 9:
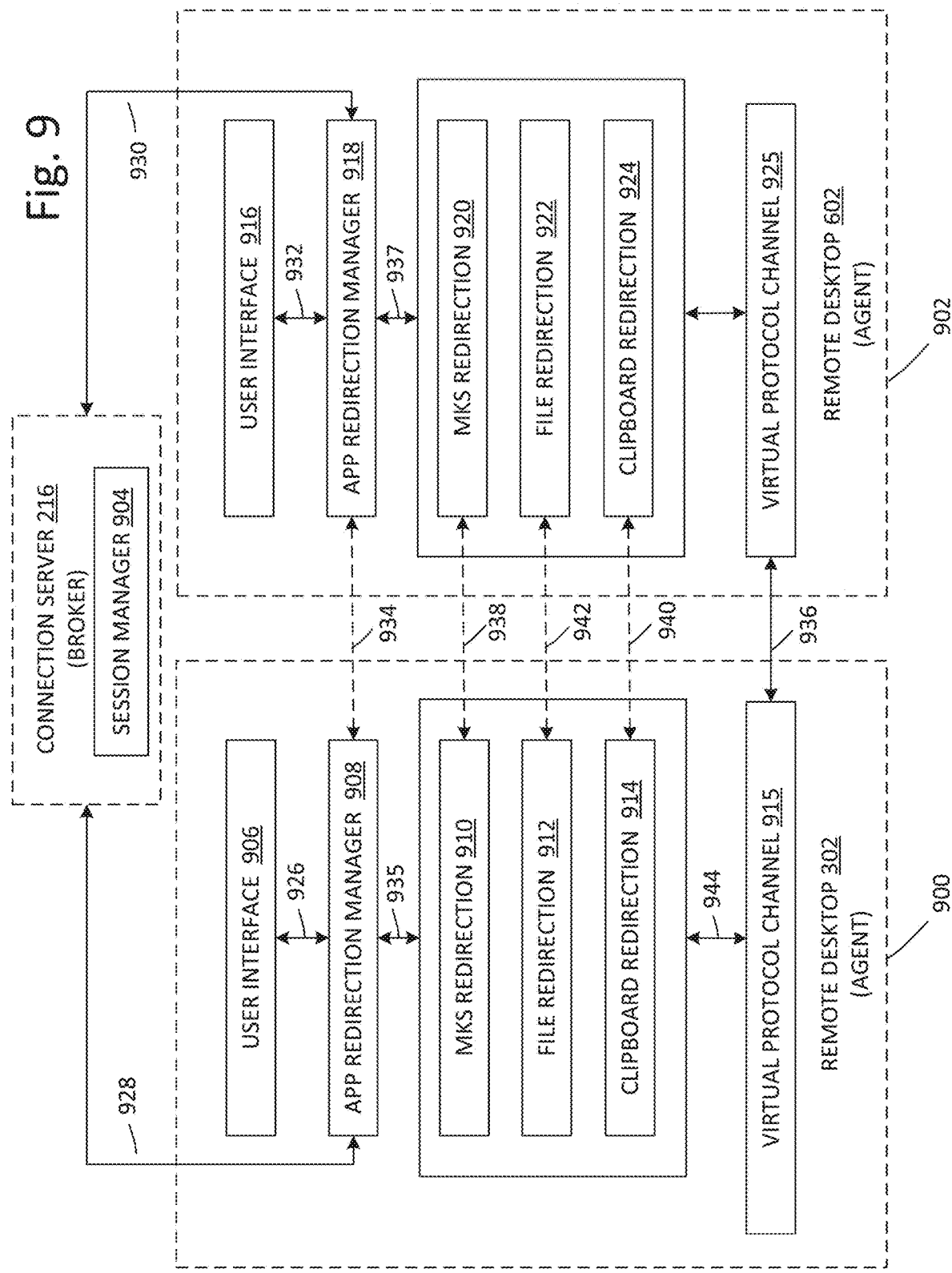
FIG. 9 is a schematic diagram illustrating components that cooperate to enable the sharing of a remote application.

FIG. 9 is a schematic diagram illustrating components that cooperate to enable the sharing of a remote application. More specifically, FIG. 9 shows example components of a first remote desktop agent 900 (e.g., a Horizon agent or other analogous remote desktop agent), another/second remote desktop agent 902 (e.g., also a Horizon agent or other analogous remote desktop agent), and other components/devices of FIG. 2 that may support the capability to share a remote application (e.g., the remote application 700) on a display screen (e.g., the display screen 600) of a target user such as depicted in FIGS. 3-8 above. Various components of the agent(s), connection server 216, etc. of FIG. 9 may be embodied as software or other computer-readable instructions stored on computer-readable media and executable by one or more processors, may be embodied in hardware, and/or may be embodied as a combination of hardware and software.

According to various embodiments pertaining to FIG. 9 and the other figures shown and described herein, the feature of being able to share remote applications between multiple remote desktops may be implemented in a VDI environment wherein local user devices (e.g., the user device 146) connect to one or more remote desktops (e.g., the remote desktop 126) via client software installed on the local client devices. For example and as described previously with respect to FIG. 2, the connection server 216 is responsible for helping to establish a remote desktop session between a client at the client side 200 and a remote desktop at the agent side 218. For instance, the connection server 216 may request a session token from the remote desktop 126 and return the session token to the client at the user device 146, and the client will then user the session token to contact the remote desktop 126 (agent) to establish a connection and virtual channel for transferring data between the user device 146 and the remote desktop 126.

With respect to the feature of sharing a remote application, the connection server 216 of various embodiments will then create a connection and a virtual channel between multiple remote desktops, so as to share the remote application between these multiple remote desktops. According to various embodiments, the feature may be deployed on a type of remote desktop that supports multiple user sessions, so that multiple users can work on the same remote desktop, if the launching of a shared remote application needs to establish another user session.

An example of the connection server 216 shown in FIG. 9 may include a session manager 904. Typically, the session manager 904 is responsible for authorizing and managing remote desktop sessions between the user device 146 and the remote desktop 126. For the feature of sharing a remote application, when a user (e.g., user 1 on a remote desktop A, such as the remote desktop 302) makes a request to share a remote application on the remote desktop 302 with a target user (e.g., the target user on a remote desktop B, such as the remote desktop 602), the request is first sent by the remote desktop 302 to the connection server 216. The session manager 904 then checks whether the target user has an active remote desktop session (e.g., is operating the remote desktop 602).

If the target user has the active remote desktop session, then the session manager 904 sends the request (e.g., the notification 606 of FIG. 6) to the active remote desktop(s) of the target user. The target user, who is working on the remote desktop 602, receives the notification 606 and can select to launch or dismiss the remote application being requested to be shared by user 1.

If the target user clicks on the launch button 608, the session manager 904 will request a session token from the remote desktop 302 and send the session token to the remote desktop 602. The remote desktop 602 then uses the session token to communicate with the remote desktop 302 and to establish a connection between these two remote desktops.

With regards to the remote desktop(s) 126 at the agent side 218, FIG. 9 depicts the remote desktop 302 and the remote desktop 602 at/as their respective agents. The components of the remote desktop 302 may include or provide a user interface (UI) 906, an application redirection manager 908, one or more redirection modules (such as a mouse-keyboard-screen (MKS) redirection module 910, a file redirection module 912, and a clipboard redirection module 914) associated with redirection events, and a virtual protocol channel 915 or other virtual channel(s). Analogously, the remote desktop 302 may include or provide a UI 916, an application redirection manager 918, one or more redirection modules (such as a MKS redirection module 920, a file redirection module 922, and a clipboard redirection module 924), and a virtual protocol channel 925 or other virtual channel(s). The details of the components of the remote desktop 302 will be described next below—the details of the components of the remote desktop 602 may be substantially the same.

The UI 906 may be configured so as to present the various configuration/settings windows (such as shown in FIGS. 3-6 and 8) on the display screen 300/600 of the respective user device. The UI 906 may be implemented to enable the user (e.g., user 1) of the remote desktop 302 to perform one or more of the following operations described below:

1. Search for and selectively filter the remote application (s) that the user wishes to share with other remote desktops.
2. Send a request to the target user(s) to share the selected remote application(s).
3. Get notified about a received request to share a remote application. The user can choose to launch the remote application for sharing, or dismiss the request and remote application.
4. Manage the sharing of remote applications, such as by checking the status of the remote application, terminating the sharing, etc.

According to various embodiments, the application redirection manager 908 may be configured to perform one or more of the following operations described below:

1. When user 1 makes a request to share a remote application with the target user (e.g., user 2) via the UI 906, the request is sent (at 926) to the application redirection manager 908, which then forwards (at 928) the request to the connection server 216. The session manager 904 then checks if there are any active remote desktops for the target user (e.g., user 2), and sends (at 930) the request to all active remote desktops (e.g. the remote desktop 602) for the target user. The application redirection manager 918 on the remote desktops 602 for the target user handles this request and works with (at 932) the UI 916 to provide a notification of the request to the target user. If the target user ignores the request by clicking dismiss button 610 on the window 604 that displays the notification 606, then the application redirection manager 918 will notify (at 930) the connection server 216, which that will then inform (at 928) user 1. If, on the other hand, the target user clicks on the launch button 608, then the application redirection manager 918 on the remote desktop 602 of the target user communicates (at one or more of 934, 936, etc.) with the remote desktop 302 of user 1 to establish a connection and virtual protocol channel 915/925 between these two remote desktops 302/602 for any appropriate data transfer.
2. The application redirection manager 908 works with (at 934) the counterpart application redirection manager 918 on the target user's remote desktop 602 to coordinate (at 935 and 937) redirection, such as MKS redirection, file redirection, and clipboard redirection.
3. The application redirection manager 908 can request any UI event triggered by user 1 to go to the application redirection manager 908, which will then handle the UI event. For example, when user 1 stops application sharing via the UI 906, this UI event will be sent (at 926) to the application redirection manager 908, which will then work (at 934) with the application redirection manager 918 on the other remote desktop 602 to end the connection (at 936) between these two remote desktops.
4. The application redirection manager 908 will keep monitoring the window of the shared remote application. If the target user closes the window of the shared remote application, the application redirection manager 908 is notified of this event and starts to end the sharing session. In some embodiments, the application redirection manager 918 on the remote desktop 602 may be notified of this event and starts to end the sharing session, alternatively or additionally to the application redirection manager 908 on the remote desktop 302 being notified and starting to end the sharing session.

With respect to the MKS redirection module 910/920, the MKS redirection module 910/920 may be configured to transfer MKS-related data between the local user device 146 and the remote desktop. With respect to the feature of remote application sharing, each MKS redirection module 910/920 of various embodiments also includes logic to enable operation between two remote desktops, such that the target user who is working on the remote desktop 602 can see the shared application and operate the shared application using the mouse and keyboard of the target user's user device. The MKS redirection module 910 on the source remote desktop 302 also may be configured to crop the graphical data of the remote desktop 302 and only transfer (at 938) the graphical data of shared application's window to the target remote desktop 602, so that the target user only sees the remote application's window instead of whole remote desktop 302 of user 1.

With respect to the clipboard redirection module 914/924, the clipboard redirection module 914/924 of various embodiments is responsible for transferring (at 940) the data of a clipboard between the two remote desktops, so that the target user who is working on the remote desktop 602 can copy/paste the content between the shared remote application and the remote desktop 602.

According to various embodiments, the file redirection module 912 may be configured to perform one or more of the following operations described below:

1. When user 1 shares a remote application on the remote desktop 302 with the target user on the remote desktop 602, the user profile folder on the remote desktop 602 will be redirected/mapped (at 942) to the remote desktop 302, so that the shared remote application can access and open the files on the remote desktop 602 of the target user. The user profile folder may be a special folder containing files and folders pertaining only to a particular user, and may contain (for example) the particular user's desktop, documents, personal data such as application preferences, etc. In Microsoft Windows, the user profile folder may be located under the C:\Users\ folder. In Linux and MacOS, the user profile folder may be located under/home/folder.
2. When the target user performs a drag-and-drop of a file on the remote desktop 602 to a remote application being shared from the remote desktop 302, this file may be first redirected to the remote desktop 302 so that the shared remote application can open the file.

In some embodiments, the file redirection module 912/922 may play a similar role as a client drive redirection (CDR) feature to map the files/folders on a target desktop to the source desktop where the remote application is shared, so that the file/folder can be accessed by the shared remote application.

The virtual protocol channels 915/925 of various embodiments may be configured for transferring content between a client and agent, and also between agents (e.g., between remote desktops). The virtual protocol channels 915 and 925 may be used for communicating (at 934-944, etc.) data, graphics, files, instructions, etc. between the two remote desktops.

Figure 10:
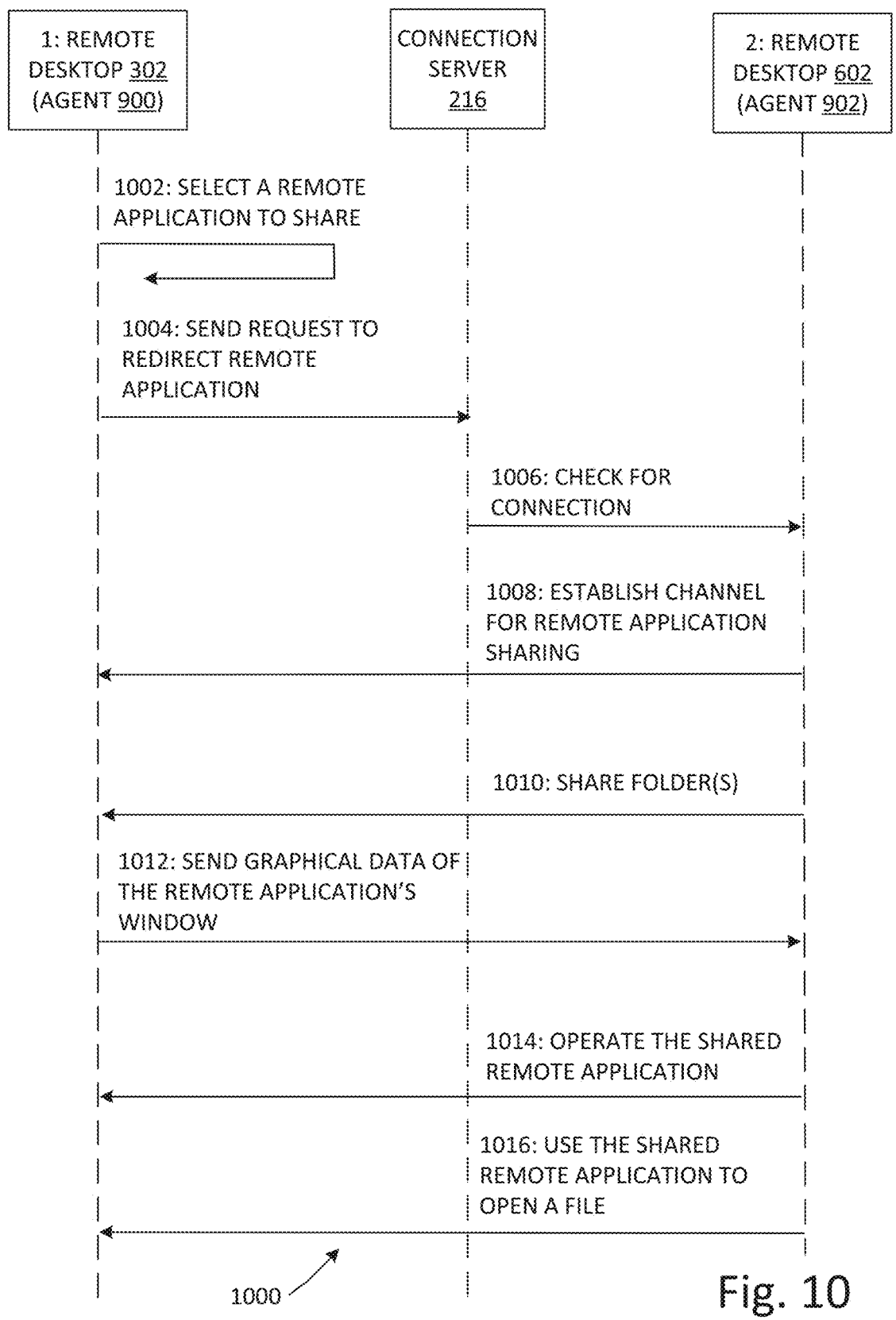

FIGS. 10 and 11 are flow diagrams of an example method 1000 to share a remote application between remote desktops. More specifically, the method 1000 may be performed to share the remote application 700 of the remote desktop 302 with the remote desktop 602, such as depicted in the examples of FIGS. 3-8.

The example method 1000 may include one or more operations, functions, or actions illustrated at 1002 to 1110, in which the operations of FIG. 10 continue into FIG. 11. The various operations of the method 1000 and/or of any other process(es) described herein may be combined into fewer operations, divided into additional operations, supplemented with further operations, and/or eliminated based upon the desired implementation. In one embodiment, the operations of the method 1000 and/or of any other process(es) described herein may be performed in a pipelined sequential manner. In other embodiments, some operations may be performed out-of-order, in parallel, etc. The operations in the method 1000 are described below with reference to the various components shown in FIGS. 1-9.

According to one embodiment, the method 1000 may be performed by one more remote desktops 126, such as the two remote desktops 302 and 602 (e.g., their respective agents), in cooperation with the connection server 216 for some operations. In other embodiments, various other elements in a computing environment may perform, individually or cooperatively, the various operations of the method 1000.

At 1002 ("SELECT A REMOTE APPLICATION TO SHARE"), the user device 146 of a first user (e.g., user 1) has established a first remote desktop session with a remote desktop 126 at the agent side (e.g., a session with the remote desktop 302 provided by the agent 900). Using the windows 314 and 400 of FIGS. 3 and 4, user 1 operates the remote desktop 302 to then select a remote application (installed on the remote desktop 302) to be shared with one or more other remote desktops of a target user (e.g., user 2). User 1 may select the target user(s) to share/redirect the remote application, such as by using the window 500 of FIG. 5. These other remote desktops of the target user(s) may be another remote desktop by the same user 1 and/or a remote desktop of some other user(s).

At 1004 ("SEND REQUEST TO REDIRECT REMOTE APPLICATION"), the remote desktop 302 generates and sends a request to redirect/share the selected remote application. The request is sent from the remote desktop 302 to the session manager 904 of the connection server 216.

At 1006 ("CHECK FOR CONNECTION"), the session manager 904 of the connection server 216 checks if the user device(s) of the target user(s) is connected to a remote desktop. For example, the session manager 904 checks to determine if the user device of user 2 is connected to the remote desktop 602 via a remote desktop session. If determined to be connected, then the session manager 904 sends the request to the remote desktop 602.

At 1008 ("ESTABLISH CHANNEL FOR REMOTE APPLICATION SHARING"), the remote desktop 602 communicates with the remote desktop 302 to establish a virtual channel for sharing the remote application, if user 2 has clicked on the launch button 608 to accept the request from user 1. In some embodiments, establishing the virtual channel between the remote desktops 302 and 602 includes establishing a (second) remote desktop session between these remote desktops 302/602 using a token.

At 1010 ("SHARE FOLDER(S)"), the remote desktop 602 shares user 2's folders (such as the user file folder on the remote desktop 602) with the remote desktop 302.

At 1012 ("SEND GRAPHICAL DATA OF THE REMOTE APPLICATION'S WINDOW"), the remote desktop 302 sends the graphical data of the window of the shared remote application to the remote desktop 602. For example, the graphical data may be cropped graphical data, so that only the window of the shared remote application is displayed on the remote desktop 602, rather than other content of the remote desktop 302. Furthermore, the remote desktop 302 gets ready to handle mouse/keyboard events from the remote desktop 602, via the MKS redirection modules 910 and/or 920, such that these mouse/keyboard events from the remote desktop 602 are applied/mapped to the shared remote application.

At 1014 ("OPERATE THE SHARED APPLICATION"), user 2 uses the remote desktop 602 to operate the shared remote application (e.g., the shared remote application 700) provided on the remote desktop 602. Examples of these operations performed on the shared remote application are described next below.

At 1016 ("USE THE SHARED REMOTE APPLICATION TO OPEN A FILE"), user 2 can use the shared remote application to open a file saved on the remote desktop 602. This may be done, for example, by clicking FILE→OPEN on a menu bar of the shared remote application, since user 2's folder has been shared with the remote desktop 302 previously at 1010 above.

Continuing now to FIG. 11, other techniques may be used to open a file for the shared remote application. For example at 1102 ("OPEN A FILE BY DRAG-AND-DROP"), user 2 can open a file by dragging and dropping the file (saved on the remote desktop 602) onto the shared remote application. In this embodiment, the file may be first shared with the remote desktop 302, and then loaded by the shared remote application.

At 1104 ("COPY/PASTE CONTENT"), user 2 can copy/paste content between the shared remote application and a native remote application that is installed on the remote desktop 602. One or more of the various redirection modules described above may be used in some embodiments in connection with performing copy/paste operations.

At 1106 ("END REMOTE APPLICATION SHARING"), user 2 can initiate the ending of the sharing of the remote application, such as by closing/exiting the window of the shared remote application. The sharing may be ended in other ways. For example at 1108 ("END REMOTE APPLICATION SHARING"), the ending of the sharing of the remote application can be initiated by user 1, such as terminating the sharing using the window 800 of FIG. 8 presented on the remote desktop 302.

At 1110 ("SHARE MULTIPLE REMOTE APPLICATIONS"), user 1 can share multiple remote applications (installed on the remote desktop 302) with user 2 and/or other users, including user 1 itself.

From the embodiments disclosed herein, several benefits are realized. For example, target users can use remote applications installed on other remote desktops as native applications when working on their remote desktops. This is a new way to help users work remotely and efficiently by coordinating applications together from different remote desktops and different users together.

Furthermore, the embodiments described herein reduce the usage of hardware resources on a cloud, since users do not need to install all/many remote applications on each and every remote desktop. Still further, the sharing of remote applications provides savings in the budget for software licenses, since there is no need to install all required applications on all remote desktops.

Also, the sharing of remote applications is useful in VDI platforms that provide a remote desktop capable to support multiple remote desktop sessions.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 1-11. For example, computing devices capable of acting as agent-side host devices or client-side user devices may be deployed in or otherwise operate in conjunction with the virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances (VCIs) may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

The invention claimed is:

1. A method to share remote applications between multiple remote desktops, the method comprising:
    establishing, by a connection server, a remote desktop session between a first user device of a first user and a first remote desktop;
    receiving, by the connection server, a selection of a remote application, installed on the first remote desktop, to be shared with a second remote desktop;
    requesting, by the connection server, a session token from the first remote desktop and receiving the session token by the connection server;
    detecting, by the connection server, whether there is an active session of the second remote desktop;
    in response to detecting the active session of the second remote desktop, sending a request from the connection server to the second remote desktop to accept the remote application for sharing, the request including the session token; and
    in response to acceptance of the request by the second remote desktop, establishing, by the connection server, a channel between the first remote desktop and the second remote desktop to share the remote application from the first remote desktop to the second remote desktop, wherein the second remote desktop uses the session token to communicate with the first remote desktop over the channel;
    wherein, in response to receiving a request to open a file stored in a folder on the second remote desktop using the shared remote application executing on the first remote desktop,
    the file is redirected from the second remote desktop to the first remote desktop over the channel, wherein the folder storing the file is mapped from the second remote desktop to the first remote desktop to enable the shared remote application executing on the first remote desktop to open the file stored on the second remote desktop.

2. The method of claim 1, wherein both the first remote desktop and the second remote desktop are associated with the first user.

3. The method of claim 1, wherein the first remote desktop is associated with the first user, wherein the second remote desktop is associated with a second user different from the first user, and wherein the second remote desktop is accessible via a second user device associated with the second user.

4. The method of claim 1, further comprising:
    ending the sharing of the remote application, wherein the first remote desktop or the second remote desktop is configured to initiate the ending the sharing of the remote application.

5. The method of claim 1, further comprising:
    receiving a request to copy content on the second remote desktop and paste the content into the shared remote application executing on the first remote desktop; and
    transferring the content from a clipboard of the second remote desktop to a clipboard of the first remote desktop to enable the shared remote application to paste the content.

6. A non-transitory computer-readable medium having instructions stored thereon, which in response to execution by one or more processors, cause the one or more processors to perform a method to share remote applications between multiple remote desktops, wherein the method comprises:
    establishing, by a connection server, a remote desktop session between a first user device of a first user and a first remote desktop;
    receiving, by the connection server, a selection of a remote application, installed on the first remote desktop, to be shared with a second remote desktop;
    requesting, by the connection server, a session token from the first remote desktop and receiving the session token by the connection server;
    detecting, by the connection server, whether there is an active session of the second remote desktop;
    in response to detecting the active session of the second remote desktop, sending a request from the connection server to the second remote desktop to accept the remote application for sharing, the request including the session token; and
    in response to acceptance of the request by the second remote desktop, establishing, by the connection server, a channel between the first remote desktop and the second remote desktop to share the remote application from the first remote desktop to the second remote desktop, wherein the second remote desktop uses the session token to communicate with the first remote desktop over the channel;
    wherein, in response to receiving a request to open a file stored in a folder on the second remote desktop using the shared remote application executing on the first remote desktop,
    the file is redirected from the second remote desktop to the first remote desktop over the channel, wherein the folder storing the file is mapped from the second remote desktop to the first remote desktop to enable the shared remote application executing on the first remote desktop to open the file stored on the second remote desktop.

7. The non-transitory computer-readable medium of claim 6, wherein both the first remote desktop and the second remote desktop are associated with the first user.

8. The non-transitory computer-readable medium of claim 6, wherein the first remote desktop is associated with the first user, wherein the second remote desktop is associated with a second user different from the first user, and wherein the second remote desktop is accessible via a second user device associated with the second user.

9. The non-transitory computer-readable medium of claim 6, wherein the method further comprises:
    ending the sharing of the remote application, wherein the first remote desktop or the second remote desktop is configured to initiate the ending the sharing of the remote application.

10. A computing device, comprising:
    a processor; and
    a non-transitory computer-readable medium coupled to the processor and having instructions stored thereon, which in response to execution by the processor, cause the processor to perform operations to share remote applications between multiple remote desktops, wherein the operations comprise:
        establish, by a connection server, a remote desktop session between a first user device of a first user and a first remote desktop;

receive, by the connection server, a selection of a remote application, installed on the first remote desktop, to be shared with a second remote desktop;

request, by the connection server, a session token from the first remote desktop and receive the session token by the connection server;

detect, by the connection server, whether there is an active session of the second remote desktop;

in response to detecting the active session of the second remote desktop, send a request from the connection server to the second remote desktop to accept the remote application for sharing, the request including the session token; and in response to acceptance of the request by the second remote desktop, establish, by the connection server, a channel between the first remote desktop and the second remote desktop to share the remote application from the first remote desktop to the second remote desktop, wherein the second remote desktop uses the session token to communicate with the first remote desktop over the channel;

wherein, in response to receiving a request to open a file stored in a folder on the second remote desktop using the shared remote application executing on the first remote desktop, the file is redirected from the second remote desktop to the first remote desktop over the channel, wherein the folder storing the file is mapped from the second remote desktop to the first remote desktop to enable the shared remote application executing on the first remote desktop to open the file stored on the second remote desktop.

11. The computing device of claim 10, wherein both the first remote desktop and the second remote desktop are associated with the first user.

12. The computing device of claim 10, wherein the first remote desktop is associated with the first user, wherein the second remote desktop is associated with a second user different from the first user, and wherein the second remote desktop is accessible via a second user device associated with the second user.

13. The computing device of claim 10, wherein the operations further comprise:
end the sharing of the remote application, wherein the first remote desktop or the second remote desktop is configured to initiate the end of the sharing of the remote application.

14. The computing device of claim 10, wherein the operations further comprise:
receiving a request to copy content on the second remote desktop and paste the content into the shared remote application executing on the first remote desktop; and
transferring the content from a clipboard of the second remote desktop to a clipboard of the first remote desktop to enable the shared remote application to paste the content.

* * * * *